April 2, 1968  J. M. FLYNN ETAL  3,376,183
METHOD OF MAKING A COMPOSITE BEARING MATERIAL
Filed May 5, 1964  2 Sheets-Sheet 1
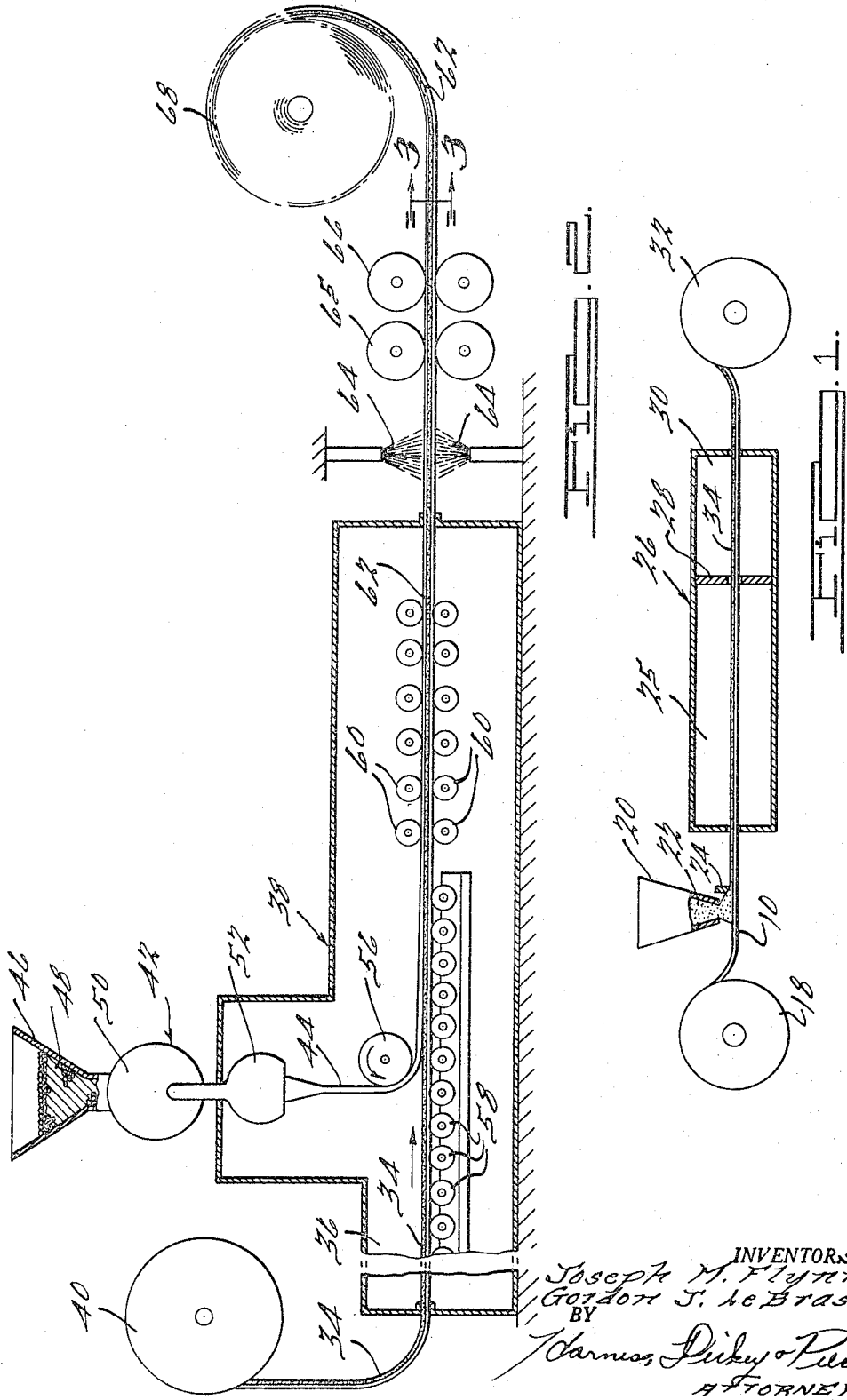
INVENTORS.
Joseph M. Flynn
Gordon J. LeBrasse
BY
ATTORNEYS.

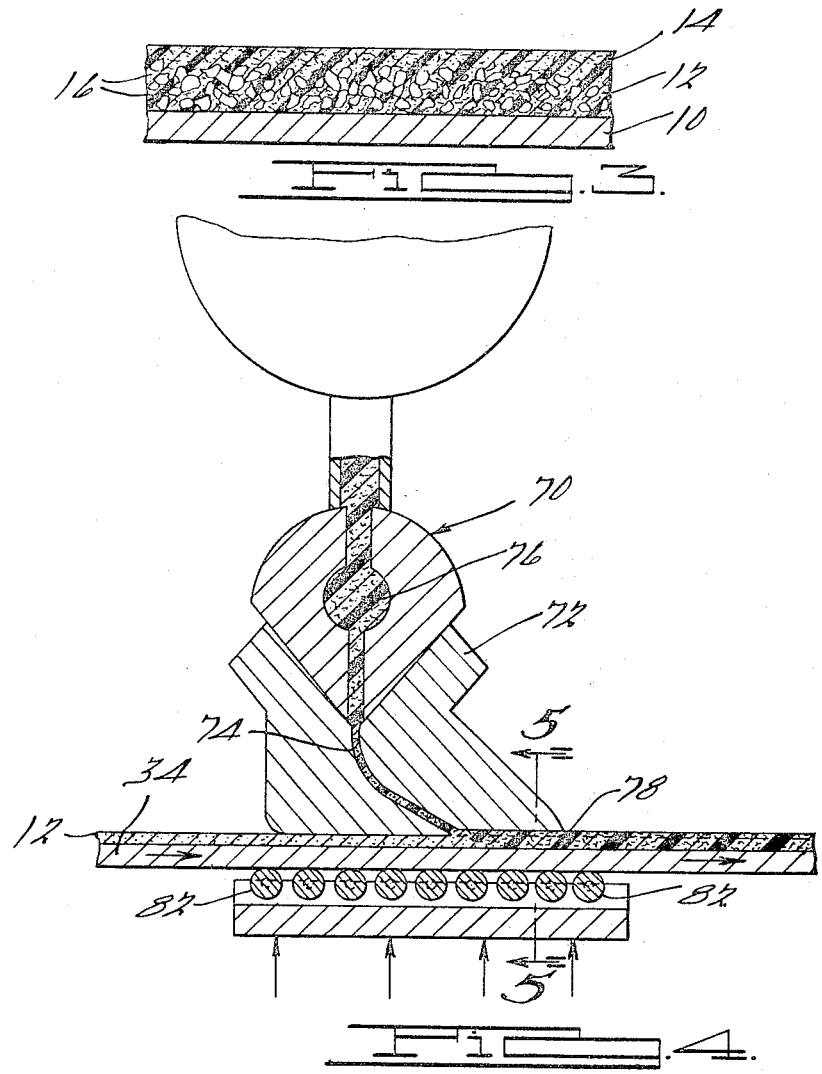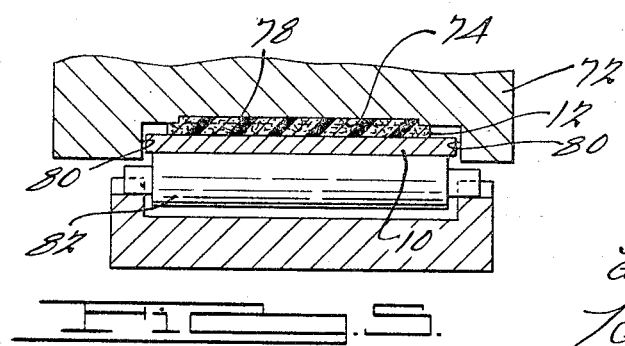

United States Patent Office 3,376,183
Patented Apr. 2, 1968

3,376,183
METHOD OF MAKING A COMPOSITE
BEARING MATERIAL
Joseph M. Flynn and Gordon J. Le Brasse, Ann Arbor, Mich., assignors to Federal-Mogul Corporation, a corporation of Michigan
Filed May 5, 1964, Ser. No. 365,047
4 Claims. (Cl. 156—244)

The present invention broadly relates to an improved antifriction material and to a method of making the material, and more particularly to an improved composite bearing material suitable for use in a substantially dry non-lubricated condition for movably supporting a bearing member under moderate loads and at relatively high temperature conditions. More specifically, the present invention is directed to an improved composite bearing material comprising a porous sintered matrix bonded to a hard metal backing strip wherein the pores of the porous matrix are substantially completely impregnated with a perfluorocarbon polymer and further including a controlled proportion of filler materials providing thereby a bearing material of excellent frictional characteristics and wear resistance. The present invention is further directed to a method of making an antifriction material of the aforementioned type.

Numerous situations arise wherein it is desirable to provide a bearing material which is effective to provide good antifriction characteristics under conditions of moderate load and temperature while in a substantially dry or non-lubricated environment. A variety of composite bearing materials and plastic materials have heretofore been used or proposed for use as antifriction materials which incorporate desirable bearing characteristics and are of good wear resistance under the foregoing operating conditions. Of the various antifriction materials known, polytetrafluoroethylene has perhaps received the most widespread use for this purpose. While antifriction materials incorporating polytetrafluoroethylene have been found to provide satisfactory performance under many different bearing operating conditions, an inherent disadvantage of the material is the difficulty encountered in the fabrication thereof into bearings of the desired configuration and size. In view of the foregoing difficulty, various alternative materials including various synthetic plastics have been proposed for use but have been found inadequate in many instances even under moderate load and temperature conditions to provide the requisite antifriction characteristics and wear resistance.

It is accordingly a principal object of the present invention to provide an improved composite bearing material which possesses excellent antifrictional characteristics and is of good wear resistance in the presence of limited lubrication when operating under moderate load and temperature conditions.

Another object of the present invention is to provide an improved composite bearing material which incorporates controlled proportions of selected filler materials imparting self-lubricating characteristics to the bearing material such that excellent antifrictional characteristics and wear resistance of the material are obtained in spite of the use of the material in the absence of appreciable quantities of conventional lubricants.

Still another object of the present invention is to provide an improved composite bearing material which possesses equal or superior antifrictional characteristics and wear resistance to that provided by bearings employing polytetrafluoroethylene and which bearing material is of simpler, more versatile and more economical manufacture.

A further object of the present invention is to provide a process for making an improved composite bearing material which is adaptable for the production of a continuous strip of the bearing material which can thereafter be readily fabricated into a variety of different shape and size bearings consistent with the intended end use.

The foregoing and other objects and advantages of the present invention are based on the discovery that by employing an interpolymer of tetrafluoroethylene and hexafluoropropylene which incorporates controlled proportions of wear resistant and lubricity filler materials, a plastic impregnant is provided for a porous matrix which possesses equal or superior bearing characteristics to that attainable with polytetrafluoroethylene. In accordance with the practice of the present invention, a composite bearing material is formed consisting of a hard metal backing member to which a porous sintered metallic matrix is tenaciously bonded and is of a controlled porosity ranging from about 10% to about 50% by volume. At least a portion of the pores of the porous matrix are thereafter impregnated with and at least partially filled with an interpolymer of tetrafluoroethylene and hexafluoropropylene incorporating therein controlled proportions of selected finely divided wear resistant filler material which is present in an amount of from about 5% to about 45% by volume of the plastic impregnant. The wear resistant filler material preferably comprises finely particulated fiber glass filaments and preferably additionally includes a finely particulated lubricity agent or agents which impart self-lubricating characteristics to the material and enhance its bearing characteristics under high load conditions. The impregnation of the porous matrix with the filled plastic interpolymer is achieved in a manner so as to preferably provide a thin residual surface coating on the exposed surface of the porous matrix of a thickness preferably ranging from about 0.0005 to about 0.005 inch. In accordance with the method comprising the present invention, the composite bearing material is formed by first sintering a finely particulated metallic powder on the surface of a hard metal backing strip such as steel, for example, producing a porous sponge or matrix which is tenaciously bonded to the backing strip and which subsequently is at least partially impregnated with the filled interpolymer plastic which is heated to a molten or heat softened condition facilitating a compacting and impregnation thereof into the pores of the matrix. The resultant impregnated material may thereafter be further compacted in a manner so as to effect further impregnation and a sizing of the resultant material and in a manner to provide a residual surface layer of the plastic on the surface of the porous matrix of a controlled thickness.

Other objects and advantages and features of the present invention will become apparent from the subsequent description and the appended claims, taken in conjunction with the accompanying drawings, in which:

FIGURE 1 is a diagrammatic side elevational view partly in section of an apparatus for applying and sintering a finely particulated metallic powder on the surface of a continuous hard metal backing strip;

FIGURE 2 is a fragmentary side elevational view partly in section of an apparatus for applying an extruded film of a heat softened inter-polymer plastic incorporating a controlled filler content on the surface of the porous matrix effecting at least partial impregnation of the pores thereof;

FIGURE 3 is a fragmentary magnified transverse sectional view of the composite bearing material produced in accordance with the apparatus shown in FIGURE 2 and taken along the line 3—3 thereof;

FIGURE 4 is a fragmentary magnified side elevational view partly in section of an alternative preferred apparatus for applying a molten or heat softened plastic interpolymer incorporating a filler uniformly distributed therethrough directly on the surface of the porous matrix effecting concurrent, at least partial impregnation of the pores thereof; and FIGURE 5 is a fragmentary transverse sectional view of the apparatus as shown in FIGURE 4 and taken along the line 5—5 thereof.

The improved composite bearing material constructed in accordance with the preferred embodiments of the present invention as best seen in FIGURE 3, comprises a hard metal backing strip 10 to which a porous sintered matrix 12 is tenaciously bonded. The sintered matrix 12 is in turn substantially completely impregnated with the perfluorocarbon interpolymer or plastic indicated at 14. The hard metal backing strip 10 may comprise any suitable metal or alloy which is of sufficient ductility and strength to provide satisfactory support of the porous sintered matrix and to enable deformation and machining of the composite bearing material into suitable bushings and bearings of the desired configuration and size. Conventionally, the hard metal backing strip may comprise a low carbon or low alloy steel but medium and high alloy steel can also be satisfactorily employed consistent with the requirements as is dictated by the intended end use of the bearing.

The porous sintered matrix 12 may comprise any one of a variety of finely particulated metallic powders which are adapted upon the heating thereof to an elevated temperature to weld together at their points of contact forming a high strength porous matrix characterized as having a plurality of intercommunicating pores or voids indicated at 16 in FIGURE 3, which are at least partially filled or impregnated with the plastic 14 forming thereby a composite construction. It is also contemplated within the scope of the present invention that the surface of the backing strip 10 may be provided with a suitable metal plating to provide an increase in the bond shear strength between the sintered matrix 12 and the backing strip. A variety of metallic platings such as copper, silver, nickel almuninum, cobalt, etc. have been found satisfactory for this purpose and are conventionally employed in thicknesses ranging from as low as 0.00005 to thicknesses up to 0.005 inch. The desirability of employing such a face plating on the backing strip to achieve an improvement in the tenacity of the bond between the porous matrix and the backing strip during the sintering operation as well as the type of metal plating employed will vary depending on the composition of the metallic powder as well as the severity of deformation to which the composite strip is to be subjected during the subsequent fabrication of bearings therefrom. Generally, satisfactory bond shear strengths between the porous matrix and backing strip are achieved without the necessity of employing an intermediate barrier layer or metallic plating but may be desirable in some instances.

The particular composition of the metallic powder employed for forming the sintered porous matrix is not critical in order to achieve the benefits of the present invention. Metallic powders consisting of copper base alloys, and particularly bronze, which may include varying amounts of lead and other metals to provide the requisite strength and bearing characteristics have been found particularly suitable for forming sintered porous matrixes. Powder compositions of the foregoing type which provide for the requisite strength and economy of the composite bearing material include, for example, 4% tin, 8% lead and the balance copper; 90% copper and 10% tin; 80% copper, 10% tin and 10% lead, 75% copper 5% tin, and 20% lead. The metallic powder employed for forming the sintered porous matrix is preferably of a spherically shaped configuration so as to provide the requisite porosity of the resultant sintered matrix enabling infiltration and impregnation thereof with the plastic. While any one of a variety of copper base powders can be satisfactorily employed in accordance with the practice of the present invention, spherically shaped copper base powder derived from the atomization of molten metal has been found particularly satisfactory in providing a strong uniformly porous matrix having a porosity ranging from about 10% up to about 50% by volume. The particle size of the copper base powder may broadly range from about 80 mesh to a size less than about 325 mesh, and preferably of a size range of from about 80 mesh to about 200 mesh.

The copper base powder particles preferably are of a size which extends over the aforementioned range as opposed to all of the powder particles being of substantially the same size.

In lieu of employing a prealloyed copper base powder, it is also contemplated that the sintered matrix can be formed from a powder blend containing copper powder admixed with suitable proportions of lead and/or tin powders which can be incorporated in amounts conventionally corresponding to the percentages as hereinbefore set forth. In such case, the lead and tin powders preferably are of a particle size of less than about 100 mesh and may be conveniently admixed with the copper powder forming a homogeneous mixture. Alternatively, when both lead and tin powder is employed all or a portion of the tin powder can be prealloyed with all or a portion of the lead powder forming prealloyed powder particles. In either case the appropriate proportions of the powder constituents can be conveniently mixed together such as, for example, in a double cone-type blender until a substantially uniform powder blend is obtained.

The prealloyed powder or powder blend is thereafter applied to the surface of the hard metal backing strip in the form of a substantially uniform layer and sintered thereon in a manner and under conditions so as to provide a net porosity of the sintered matrix broadly ranging from about 10% to about 50% by volume. The particular temperature employed during the sintering operation will vary in accordance with the composition of the powder employed. The thickness of the sintered layer can be varied consistent with the intended end use of the resultant composite bearing material and conventionally may range from about 0.005 to about 0.030 inch which is suitable for most purposes. Generally a sintered matrix having a thickness ranging from about 0.010 to about 0.015 inch is preferred and provides a bearing of excellent performance and of reasonable cost.

The plastic constituent indicated at 14 in FIGURE 3 of the composite bearing material comprises a perfluorocarbon polymer which consists of an interpolymer of tetrafluoroethylene and hexafluoropropylene. The plastic constituent may be conveniently made by the interpolymerization of hexafluoropropylene and tetrafluoroethylene in the presence of a free radical polymerization initiator while regulating the proportions of monomers and the concentration of the initiator to produce an intermediate interpolymeric composition which can be separated from the reaction mass and thereafter heated to the molten state under vacuum to remove any volatiles entrapped therein. The interpolymerization may be conveniently carried out at a temperature of 50 to 150° C. and at a pressure of 20 to 70 atmospheres during a period ranging from about 10 to about 180 minutes in the presence of an aqueous solution of inorganic free radical initiator while maintaining the weight ratio of the monomers hexafluoropropylene/tetrafluoroethylene averaging in the range from 3/7 to 9/1, and the initiator present at a concentration effective to generate active free radicals at a rate averaging in the range from $4 \times 10^{-3}$ to $3 \times 10^{-6}$ moles per minute per liter of solution under the reaction conditions. The chemistry and the processes for making polymers of the aforementioned type are more fully described in U.S. Patent No. 2,946,763 granted July 26, 1960, to Bro et al.

The perfluorocarbon interpolymers of tetrafluoroethylene and hexafluoropropylene (FEP) of the aforementioned type which are suitable for use in accordance with the present invention are characterized as possessing melting characteristics enabling fabrication thereof by melt extrusion either in the form of a film which can be impregnated into the porous matrix or alternatively extruded directly on to the surface of the porous matrix effecting concurrent impregnation of the pores thereof. The ability of such resins to be extruded enabling rapid and economical fabrication of composite bearing materials in accordance with the practice of the present invention constitutes a significant advantage over polytetrafluoroethylene (PTFE) resins which have heretofore been employed but are extremely difficult to fabricate due to their excessive viscosity at their melting point. While such FEP resins provide for a distinct advantage in the fabrication of bearing materials, a problem which has heretofore restricted their use in such applications has been the substantial inferiority of their bearing characteristics and wear resistance in comparison to conventional PTFE plastics. In accordance with the discovery comprising the present invention, it has been found that by incorporating controlled proportions of an inert wear resistant filler material distributed substantially uniformly throughout the FEP plastic, that bearing characteristics can be achieved which are equal to and superior in some instances to that obtainable with conventional PTFE.

Inert wear resistant fillers which have been found to provide a surprising improvement in the bearing characteristics and wear resistance of the FEP plastic include fiber glass, glass powder, mica particles, wood particles, wood flour, iron oxide particles, lead and lead oxide particles, talc, carbide particles, vermiculite particles, ceramic and cermet particles, and mixtures thereof. Of the foregoing, the preferred material comprises finely chopped or particulated fiber glass filaments which are of a diameter and length enabling substantially uniform distribution thereof throughout the plastic material and enabling impregnation of the plastic into the pores of the sintered matrix.

Fiber glass filaments which have been found particularly satisfactory for forming a filled FEP plastic impregnant for the composite bearing material comprise filaments having a nominal diameter of from about 8 to about 10 microns and a nominal length of about $\frac{1}{64}$ of an inch. The quantity of the wear resistant filler or mixture of fillers employed in the plastic may range from about 5% up to about 45% by volume and preferably from about 15 to about 30% by volume of the filled plastic impregnant.

In addition to the wear resistant filler material, the plastic impregnant preferably, further incorporates a controlled quantity of small, fine-sized particles of a lubricity agent which are preferably of a particle size of less than about 20 microns. Lubricity agents or friction-reducing additives suitable in accordance with the present invention include molybdenum, molybdenum, disulfide, graphite, boron nitride, PTFE fibers or powders, as well as mixtures thereof. Of the foregoing friction reducing additives, molybdenum disulfide particles constitute the preferred material. The particulated friction reducing additives are incorporated in an amount up to about 40% by volume of the plastic impregnant, and preferably from about 8% to about 10% by volume. The total filler constituents consisting of the wear resistant filler and the friction reducing particles are controlled so as not to exceed about 45% by volume of the total filled plastic material, of which the wear resistant filler constitutes from about 20% to about 80% and the friction reducing additive constitutes from about 20% to about 80% by volume.

The FEP plastic in a finely divided powder state, the wear resistant filler, and the friction reducing particles, if employed, are admixed with each other until a substantially uniform blend is obtained. The resultant blend or mixture can thereafter be heated and extruded forming a preformed film or sheet, or can be extruded directly on the surface of the porous matrix in a manner subsequently to the described, forming therewith a plastic coating incorporating the filler particles substantially uniformly distributed throughout.

The improved bearing material as illustrated in FIGURE 3, will now be further described in connection with the apparatus for forming the bearing material as illustrated in FIGURES 1, 2, 4, and 5. As shown in FIGURE 1, the hard metal backing strip 10 is unwound from a feed roll 18 and is extended horizontally therefrom beneath a suitable trough or hopper 20 containing metallic powder particles 22 for forming the sintered porous matrix. The metallic powder 22 is deposited on the upper surface of the backing strip 10 in the form of a substantially uniform layer by means of a doctor blade 24 and the strip is thereafter advanced into a sintering chamber 25 of a furnace 26 in which the powder layer is heated to the appropriate sintering temperature while exposed to a reducing atmosphere such as, for example, a cracked gas atmosphere. The time and temperature of the sintering operation is controlled consistent with the particular composition of the metallic powder employed for forming the porous matrix so as to provide a tenaciously bonded matrix having a porosity ranging from about 10% up to about 50% by volume.

The furnace 26 is preferably provided with a partition 28 through which the hot sintered strip passes from the sintering chamber 25 into a cooling chamber 30 after which the strip may be conveniently wound up on a suitable takeup reel 32. Alternatively, the backing strip incorporating the sintered porous matrix thereon can be advanced directly from the cooling chamber into the inlet side of the apparatus as shown in FIGURE 2 in which the filled FEP plastic is applied to and impregnated into the sintered porous matrix. The cooling chamber 30 of the apparatus shown in FIGURE 1 is also provided with a reducing atmosphere to minimize oxidation of the porous matrix during the cooling phase of the process cycle. In the particular arrangement as illustrated in FIGURE 1, the cooling chamber serves to cool the composite strip indicated at 34 to a temperature sufficiently low so as to prevent excessive oxidation of the porous strip upon the exiting thereof from the cooling chamber. If, on the other hand, the composite strip 34 is to be advanced directly to the plastic impregnating phase of the process, the cooling chamber is controlled so as to reduce the temperature of the composite strip to a level slightly above the melting point of the plastic to be subsequently applied avoiding thereby any necessity for preheating the composite strip prior to plastic impregnation.

In accordance with the two-step process as illustrated in FIGURES 1 and 2, the composite strip 34 prepared in accordance with the process illustrated in FIGURE 1, is subsequently transferred to the inlet end of the process illustrated in FIGURE 2 in the form of a coiled up feed roll 40 from which it is continuously unwound and advanced into a preheat section 36 of a furnace 38. The composite strip 34 advanced through the preheat section 36 is heated to an appropriate temperature and is thereafter advanced beneath an extrusion assembly 42 from which an extruded film of plastic 44 is applied to the upper surface of the porous matrix thereof. The extrusion assembly 42 comprises a hopper 46 containing a particulated mixture 48 of the FEP plastic, wear resistant filler and friction reducing particles which move downwardly into a heating section 50 and are molten and subsequently extruded through a film extrusion die 52 forming a curtain or film of heat softened plastic in which the filler particles are substantially uniformly distributed throughout. The molten plastic is heated to a temperature above its heat softening point and below that at which rapid thermal degradation thereof occurs.

The plastic film 44 in a heat softened condition is tensioned and pulled downwardly and beneath a drawdown roll 56 disposed in spaced relationship above the composite strip 34 which is supported along its lower surface by a series of supporting rollers 58. The composite strip 34 having the molten plastic film 44 on the upper surface thereof is thereafter advanced horizontally between a series of longitudinally spaced impregnating rolls 60 which apply pressure to the film, effecting penetration thereof into the pores of the porous matrix. The impregnation rolls 60 are spaced in a manner so as to effect substantially complete filling of the pores of the matrix which as hereinbefore set forth has a porosity ranging from about 10% to about 50% by volume. Moreover, the spacing of opposed sets of the impregnation rolls and the thickness of the plastic film 44 deposited are controlled so as to provide for a substantially continuous residuary film of plastic on the surface of the matrix after impregnation has been carried out. While some air may be occluded within the porous matrix it has been found that satisfactory bearings are obtained by effecting at least about a 75% filling of the pores of the matrix and preferably a filling of at least about 90% of the porosity of the matrix. The impregnation is also preferably carried out in a manner so that the plastic extends into the matrix to a point contiguous to the interface between the steel backing strip and the porous matrix bonded thereto.

The impregnating rolls 60 are preferably maintained at a temperature below about 300° F. to prevent any tendency of the plastic to adhere thereto. The gaps between each side of the impregnating rolls 60 may also be arranged to progressively decrease in size on moving toward the right as viewed in FIGURE 2 effecting thereby a progressively greater impregnation of the porous matrix with the filled plastic. The resultant composite bearing material indicated at 62 passing between the last of the sets of impregnating rolls 60 is thereafter advanced and passes out of the exit end of the furnace 38 and is rapidly cooled to a temperature below the melting point of the plastic such as, for example, by means of a pair of water spray jets 64. After a cooling of the composite bearing material 62, the strip is advanced between one or a plurality of sets of sizing rolls such as sizing roll sets 65 and 66 as illustrated in FIGURE 2 which provide for further compression of the strip imparting thereby a smooth uniform surface finish to the residuary layer of the plastic on the surface of the porous matrix and further effecting an accurate gauging of the thickness of the composite bearing material. The resultant composite bearing material 62 may thereafter be conveniently coiled on a takeup reel 68 in which form it can be transferred to subsequent fabricating operations for forming bearings of the desired size and configuration.

In lieu of applying the filled FEP plastic in the form of a molten plastic film 44 as illustrated in FIGURE 2, it is also contemplated within the scope of the present invention that a film of the plastic can be preliminarily extruded of the desired width and thickness incorporating therein the filler particles which can be stored in the form of a reel until impregnation of a porous matrix is desired. In such case the preformed plastic can be placed in overlying relationship on the composite strip 34 and advanced in that position through the preheat chamber 36 of the furnace 38 as illustrated in FIGURE 2, effecting thereby a heat softening thereof to an extent enabling impregnation of the porous matrix by the series of impregnating rolls 60 in a manner as hereinabove described. In accordance with this latter procedure, the preformed plastic film supplied in the form of a roll or reel, can be continuously unwound therefrom in response to the unwinding and advancement of the composite strip 34 from a reel such as the reel 40 illustrated in FIGURE 2.

An alternative and preferred method of effecting impregnation of the porous matrix is illustrated in FIGURES 4 and 5. As shown in FIGURE 4, an extrusion assembly 70 is provided for melting the particulated mixture of the FEP plastic, wear resistant filler and friction reducing particles which thereafter passes downwardly into an extrusion coating die 72 which is disposed in contact with the surface of the composite strip 34 advanced therebelow. The extrusion coating die 72 is formed with a cavity 74 for receiving the molten plastic mixture 76 and is inclined in the direction of travel of the composite strip or in a direction toward the right as viewed in FIGURE 4. The outer edge of the downstream end of the cavity 74 is spaced from the surface of the porous matrix 12 a sufficient distance so as to deposit a plastic film 78 on the surface of the matrix in response to the advancing movement of the composite strip.

The cavity 74 in the extrusion coating die 72 as best seen in FIGURE 5, extends transversely of the composite strip to a point spaced inwardly of the side edges of the porous sintered layer 12. The extrusion coating die 72 is also formed with a pair of diametrically opposed longitudinally extending guide edges indicated at 80 for slidably contacting the side edges of the backing strip 10 maintaining it in appropriate lateral alignment relative to the coating die 72. A suitable support such as support rolls 82 are provided which are adapted to movably support the underside of the backing strip 10 as it is advanced beneath the extrusion assembly 70.

In the method incorporating the extrusion coating die 72 as shown in FIGURES 4 and 5, partial to complete impregnation of the porous matrix is effected beneath the die cavity 74 by the fluid pressure of the molten plastic. This pressure may conventionally range from about 200 up to about 10,000 p.s.i. depending on the design of the die clearances and operating conditions of the extruder. The resultant composite strip incorporating the plastic film 78 thereon deposited in a manner as illustrated in FIGURES 4 and 5 may subsequently be advanced through a series of impregnating rolls such as the impregnating rolls 60 as illustrated in FIGURE 2, effecting substantially complete impregnation of the porous matrix which may be followed thereafter by a rapid cooling and sizing of the composite bearing material in the same manner as hereinbefore described.

Regardless of the specific method employed for effecting substantially complete impregnation of the porous matrix, the temperature to which the filled plastic is heated during the impregnation step is controlled to be below that at which rapid thermal degradation thereof will occur. FEP type perfluorocarbon polymers which are commercially available and have been found exceptionally satisfactory for forming a composite bearing material in accordance with the teachings of the present invention, include materials available from Du Pont de Nemours & Company, which are commercially designated as Teflon 100 and Teflon 110. Teflon grade 100 corresponds to a plastic having good extrusion characteristics and constitutes the preferred material while Teflon grade 110 is better adapted for injection molding but can also be satisfactorily employed. Both of these plastics have a specific gravity ranging from about 2.12 to about 2.17; a tensile strength at room temperature of about 3,000 p.s.i.; an elongation of 300%; a flexural modulus of 95,000 p.s.i.; a hardness measured on the durometer scale of D55; and a deformation under a load of 1,000 p.s.i. at 70° F. for a period of 24 hours of 1.8%. In addition, the grade 100 FEP plastic has an impact strength at −65° F. of 2.9 foot pounds per inch. The melting point of the grade 100 FEP plastic is within a range of from about 545° F. to about 563° F. while the melt point of the grade 110 FEP plastic ranges from about 525° F. A heating of the FEP plastic grade 100 to a temperature between about 680° F. to about 730° F. during the impregnation step has been found to provide for satisfactory flow and impregnation by the plastic of the pores of the porous matrix. Generally, temperatures above about 750° F. have been found to cause rapid thermal degradation of these materials and accordingly temperatures below 750° F. which provide for sufficient fluidity of the filled plastic to effect impregnation are preferred.

In addition, the impregnation of the porous strip is performed so as to provide a residuary film of the plastic on the surface of the porous matrix after sizing of the strip of a thickness which may range from about 0.0005 to about 0.005 inch. The residuary film on the surface of the porous matrix is characterized as being substantially continuous over substantially the entire area of the strip and its presence provides for still further improvements in the antifriction characteristics and wear resistance of the composite bearing material. The resultant composite bearing material comprising the backing strip incorporating the porous matrix thereon which has been impregnated with the filled FEP plastic is characterized as having exceptionally good bearing characteristics for use under light and moderate load conditions at temperatures up to about 450° F.

EXAMPLE 1

A series of composite bearing materials were prepared incorporating varying amounts of filler materials including fiberglass and molybdenum disulfide particles which were subsequently evaluated to determine the antifriction characteristics and abrasion resistance of the material. The bearing materials were prepared employing a type 1010 steel backing strip to which a sintered bronze matrix containing 88% copper, 4% tin and 8% lead was applied in a thickness ranging from about 0.010 to about 0.015 inch and tenaciously bonded thereto. The composite strip thus formed was impregnated with a plastic incorporating the filler constituents in a manner so as to provide a residuary film having a thickness of about 0.0005 to about 0.002 inch. The fiberglass filaments comprised a type E glass fiber supplied by Owens-Corning Fiberglas Corporation which were of a nominal length of about 1/64 inch and a nominal diameter of about 9 microns. The molybdenum disulfide particles incorporated in the FEP plastic had nominal sizes of below about 20 microns.

Five different formulations were prepared containing FEP plastic, a fiberglass filler and molybdenum disulfide in the proportions as set forth in Table I:

TABLE I

| Sample | Percent by Volume | | |
|---|---|---|---|
| | Fiberglass | MoS$_2$ | FEP Plastic |
| A | 30 | 10.6 | Balance. |
| B | 28 | 5.0 | Do. |
| C | 19 | 7.5 | Do. |
| D | 19.6 | 10.4 | Do. |
| E | 18.4 | (*) | Do. |

*Contains 3.6% ferric oxide.

As will be noted, sample E incorporated 8% by weight of ferric oxide in lieu of molybdenum disulfide. The formulations were prepared by uniformly admixing the several constituents together in the proportions specified and were thereafter seived through a 48 mesh screen to remove any excessively large particles which would hinder uniform spreading of the plastic on the sintered porous matrix. Bearing material samples of a size of 2 inches by 5 inches were hand prepared by applying a layer of the powder at a thickness of about 0.010 to about 0.015 inch on the surface of the porous matrix and the samples were thereafter placed in a heated platen at a temperature of 680° F. under a pressure of 275–300 p.s.i. for a period of time sufficient to effect melting of the plastic and substantially complete impregnation of the porous matrix without effecting any appreciable collapse of the pores thereof. The samples were thereafter cooled while retained under pressure to a temperature below 350° F. and thereafter removed from the press. The original composite strip had a nominal thickness of about 0.061 inch which after impregnation increased to about 0.065 inch. After being cooled to room temperature, the test samples were subjected to a cold rolling operation in which the nominal thickness of the resultant impregnated bearing material was reduced to a nominal thickness of about 0.062 inch.

Four test specimens of each of samples A–E were prepared which were subjected to three tests employing a Hohman tester. In Test No. 1, a speed of 400 r.p.m. (111 SFPM) was maintained for 4000 revolutions commencing at room temperature and at a load of 1 pound corresponding to an average pressure of about 3000 p.s.i. The average pressure was determined as corresponding to the load imposed over one-half of the projected worn area of the specimen at the conclusion of each test. Test 2 was similar to Test 1 with the exception that a load of one-half pound corresponding to an average pressure of 1500 p.s.i. was employed for a duration of 7500 revolutions. Test 3 was also similar to Test 1 with the exception that a load of 1/4 pound corresponding to an average pressure of 1000 p.s.i. was employed for a duration of 10,000 revolutions. The results of these tests corresponding to the average obtained on four test specimens of each sample for each of the three test conditions are set forth in Table 2.

TABLE II

| Sample | Wear, inches | Static Friction | Dynamic Friction | Maximum Temperature, °F. |
|---|---|---|---|---|
| Test #1: | | | | |
| A | 0.003 | 0.04 | [1] 0.08 | 175 |
| B | 0.0055 | 0.04 | [1] 0.17 | 275 |
| C | 0.0065 | 0.04 | [2] 0.40 | 400 |
| D | 0.005 | 0.04 | [2] 0.20 | 300 |
| E | 0.004 | 0.04 | [3] 0.17 | 250 |
| Test #2: | | | | |
| A | 0.003 | 0.05 | [3] 0.09 | 190 |
| B | 0.005 | 0.05 | [2] 0.23 | 275 |
| C | 0.003 | 0.05 | [3] 0.06 | 175 |
| D | 0.003 | 0.05 | [3] 0.08 | 200 |
| E | 0.0035 | 0.06 | [3] 0.17 | 275 |
| Test #3: | | | | |
| A | 0.003 | 0.09 | [3] 0.06 | 165 |
| B | 0.005 | 0.05 | [2] 0.24 | 260 |
| C | 0.0025 | 0.08 | [3] 0.06 | 165 |
| D | 0.0025 | 0.09 | [3] 0.06 | 175 |
| E | 0.003 | 0.09 | [3] 0.21 | 280 |

[1] Gradually rising.
[2] Rising.
[3] Constant.

The data as set forth in the foregoing table reveal that under the conditions of Test 1 which represents the high load test, sample A, possessed the best wear and friction coefficient. In Tests 2 and 3, samples A, C and D possessed almost identical properties in terms of their wear and coefficient of friction. Tests 2 and 3 are of substantially lower loading than Test 1, but also represent relatively severe operating conditions for bearing materials of the type to which the present invention is applicable.

These test results were compared with results obtained under identical conditions with conventional polytetrafluoroethylene bearings and revealed that the composite bearing materials made in accordance with the present invention are of equivalent and in some conditions of superior bearing characteristics than the results obtained on polytetrafluoroethylene. The results obtained on sample E substantiate the usefulness of ferric oxide as an additional additive to the fiberglass filled FEP plastic material either alone or in combination with other alternative fillers such as graphite, for example.

Alternative suitable filled FEP plastics which can be satisfactorily employed for impregnating the porous matrix are set forth in the following examples. It will be understood that the examples are provided for illustrative purposes and are not intended to be limiting of the scope of the present invention as defined in the subjoined claims.

EXAMPLE 2

Percent by wt.
Glass powder _____ 30
Graphite _____ 10
FEP plastic, balance.

EXAMPLE 3

Fiberglass _____ 20
Boron nitride _____ 10
FEP plastic, balance.

EXAMPLE 4

| | |
|---|---|
| Vermiculite | 25 |
| MoS$_2$ | 5 |
| Graphite | 5 |
| FEP plastic, balance. | |

EXAMPLE 5

| | |
|---|---|
| Fiberglass | 15 |
| Glass powder | 15 |
| PTFE particles | 5 |
| FEP plastic, balance. | |

EXAMPLE 6

| | |
|---|---|
| Figerglass | 15 |
| Iron oxide | 10 |
| Molybdenum | 5 |
| Molybdenum disulfide | 5 |
| FEP plastic, balance. | |

EXAMPLE 7

| | |
|---|---|
| Talc | 15 |
| Boron nitride | 10 |
| FEP plastic, balance. | |

EXAMPLE 8

| | |
|---|---|
| Lead oxide | 15 |
| Molybdenum disulfide | 10 |
| FEP plastic, balance. | |

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. The method of making a composite bearing material which comprises the steps of providing a hard metal backing strip, applying a metallic powder layer to one surface of said backing strip, sintering said powder layer forming a composite strip comprising a porous sintered matrix having a porosity of from about 10% to about 50% by volume which is tenaciously bonded to said backing strip, providing a heat softenable plastic consisting essentially of an interpolymer of tetrafluoroethylene and hexafluoropropylene incorporating a solid filler dispersed as discrete particles substantially uniformly therethrough, heating said composite strip and said plastic to a temperature at which a heat softening of said plastic occurs to enable extrusion thereof, extruding the heat softened said plastic at a pressure of from about 200 p.s.i. to about 10,000 p.s.i. into direct contact with said porous matrix and in lateral confined relationship with respect to the longitudinal side edges of said strip effecting a concurrent impregnation of at least some of the pores of said matrix and a coating of the exposed surface of said matrix with a substantially continuous residuary film of said plastic, cooling the coated and impregnated said composite strip to a temperature below the heat softening point of said plastic, and thereafter further compressing the cooled said composite strip effecting a gauging thereof and a sizing of said residuary film.

2. The method as defined in claim 1, wherein said extruding step is controlled to effect at least about 75% filling of the pores of said matrix.

3. The method as defined in claim 1, wherein said extruding step is controlled to effect at least a 90% filling of the pores of said porous matrix.

4. The method as defined in claim 1, wherein said compressing of the cooled said composite strip is achieved by passing said composite strip between a pair of compacting rolls.

References Cited

UNITED STATES PATENTS

| 2,691,814 | 10/1954 | Tait | 29—182.5 |
| 2,798,005 | 7/1957 | Love | 117—8 |
| 2,995,462 | 8/1961 | Mitchell et al. | 308—238 X |
| 3,067,135 | 12/1962 | Strub | 252—12 |
| 3,155,566 | 11/1964 | Fisher | 161—189 X |
| 3,161,560 | 12/1964 | Paquin et al. | 161—250 |

EARL M. BERGERT, *Primary Examiner.*

HAROLD ANSHER, *Assistant Examiner.*